July 16, 1957
G. L. BRIDGER ET AL
2,799,377
FEED CHUTE STRUCTURE AND METHOD OF FEEDING PARTICULATE MATERIAL
Filed May 27, 1952
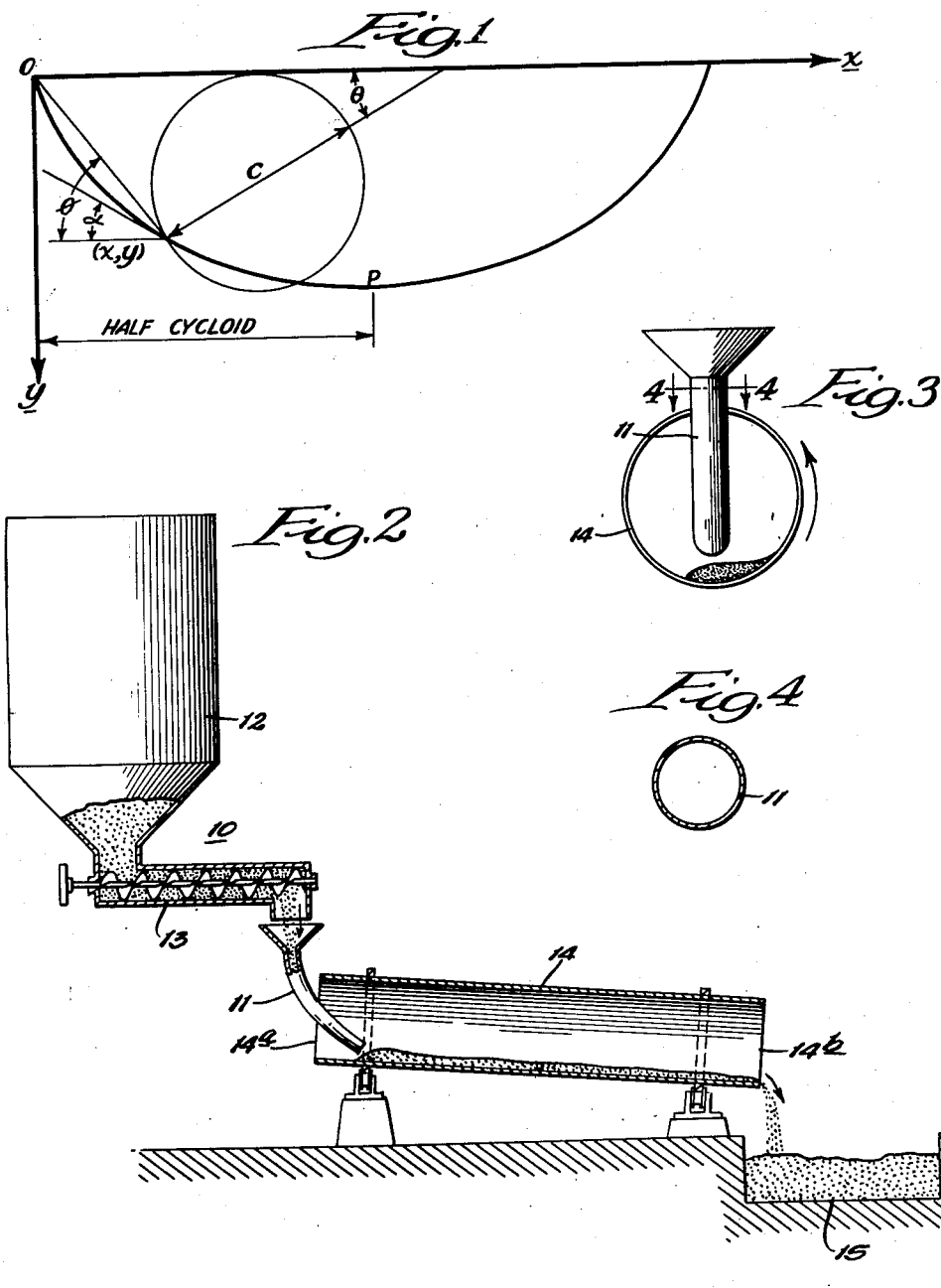
INVENTORS:
Grover L. Bridger and
Gordon Dean Specht,
BY Dawson & Ooms,
ATTORNEYS.

United States Patent Office 2,799,377
Patented July 16, 1957

2,799,377

FEED CHUTE STRUCTURE AND METHOD OF FEEDING PARTICULATE MATERIAL

Grover L. Bridger and Gordon Dean Specht, Ames, Iowa, assignors to Iowa State College Research Foundation, Inc., Ames, Iowa, a corporation of Iowa Application May 27, 1952, Serial No. 290,204

4 Claims. (Cl. 193—2)

This invention relates to a feed chute structure and method of feeding particulate material. More particularly, in one of its aspects, this invention relates to a feed chute structure having a downward curvature conforming generally to the curvature of a segment of a cycloid. Feed chutes constructed in accordance with this invention, and also the method of this invention, have particular utility in feeding fine mesh size solid material. In its method aspect, this invention contemplates primarily the feeding of fine mesh size solid material from a higher to a lower point by passing the material downwardly along a generally cycloidal path.

The problem of feeding fine mesh size solid material from a higher to a lower point is frequently encountered in industrial operations. Straight tubular chutes are widely used for this purpose, and curved tubular chutes are also employed to some extent. Generally, it is desired to carry out this phase of the handling of particulate materials as economically and efficiently as possible. More specifically, it is desired to feed the maximum amount of particulate material in a minimum of time. Upon considering such features as equipment cost, space saving, etc., it can be appreciated that it would be desired to use a chute structure for this purpose having a minimum cross-sectional area while achieving the desired results. In other words, for chutes of a given cross-sectional area, it would be desired to design the chutes in such a way that they have a maximum flow capacity (that is, for example, chutes which are capable of transferring a maximum number of pounds of material per hour). Prior to the present invention, substantially no theoretical or practiacl investigation of the above problem has been disclosed in the literature. As indicated above, straight tubular chutes are generally used for transferring fine mesh solid material from a higher to a lower point. Apparently, it has been tacitly assumed, since a straight line is the shortest distance between two points, that straight chutes give maximum flow capacity. Curved chutes have also been used, but there has apparently been no effort made to control the curvature, or employ a selected curve shape which is designed to maximize the flow capacity of the chute.

It is a general object of the present invention to provide a chute structure and method of feeding fine mesh size solid material which achieves much greater rates of flow than have heretofore been thought possible for tubular chutes of the same cross-sectional area. Further objects and advantages will appear as the specification proceeds.

This invention is illustrated in the accompanying drawing, in which—

Figure 1 is a construction diagram of a cycloid illustrating the various angles and cycloidal segments with which this invention is concerned; Fig. 2, a somewhat diagrammatic elevational view of an apparatus for handling and processing fine mesh size material embodying the present invention and the feed chute structure employed therein; Fig. 3, an enlarged fragmentary view of the apparatus of Fig. 2 looking into the feed end of the rotary kiln or dryer; and Fig. 4, a cross-sectional view of the feed chute of Fig. 2 taken on line 4—4 of Fig. 3.

One phase of this invention is based on the discovery that tubular chutes having the shape of a segment of a cycloid possess unexpectedly greater flow capacities than straight chutes of the same cross-sectional area, and this effect has been discovered to be pronounced for fine mesh size solid material. Furthermore, the segment of the cycloid employed in forming the chute has been found to be critical. When the segment of a cycloid is properly selected in accordance with this invention, it has been discovered that up to about twice as much small mesh size material can be passed through a cycloidal chute as through a corresponding straight chute (that is, a straight chute having the same cross-sectional area and conveying material between the same two points).

A cycloid can be defined as the curve generated by a point on a circle while the circle rolls along a straight line. A full cycloid is generally understood to be the full curve originating and ending on the straight base line along which the generating circle rolls. Fractional portions or segments of a full cycloid are referred to herein, such as half cycloid, etc.

Referring to Figure 1, the mathematical equations for a cycloid are:

$$x = c(\theta - \sin\theta)$$
$$y = c(1 - \cos\theta)$$

where $x$ and $y$ are the coordinates of any point on the cycloidal path, $c$ is the diameter of the generating circle, and $\theta$ is the angle in radians through which the generating circle has revolved in describing the cycloid from the origin at point O to the point having coordinates $x$ and $y$.

The angle $\phi$ shown in Figure 1 is the angle between the horizontal and the straight path from the origin at point O to the point having coordinates $x$ and $y$. This angle is useful in designating the portion of the cycloid under consideration. When a half cycloid (curve OP on Figure 1) has been described by the generating circle, $\theta$ is 90° and $\phi$ is 32° 29'. For fractional segments of a half cycloid, $\phi$ becomes larger and approaches 90° as the fraction approaches 0.

The angle $\alpha$ in Figure 1 is the angle between the horizontal and the tangent to the cycloid at a point on the cycloid having coordinates $x$ and $y$. It is the angle at which material would be discharged from a cycloidal chute of this length.

This invention, of course, is concerned with three-dimensional feed chutes, and, therefore, it will be necessary to employ an established convention in applying the angles, cycloidal segments, etc., designated in Fig. 1 to actual feed chutes. However, it is believed that the applicability of construction diagram Fig. 1 will be apparent if it is agreed that the feed chute structures falling within the scope of this invention are those which exhibit a cycloidal shape when viewed in side elevation, and can, therefore, be said to have a downward curvature corresponding to a segment of a cycloid.

In the experimental work leading to this invention, it was found in feeding fine mesh size material through tubular chutes having the downward curvature of a segment of a cycloid, that when the segment was half cycloid or greater, little, if any, flow took place. However, as the segment was shortened to less than half cycloid, correspondingly increasing the angle $\phi$, a range of cycloid segments was reached in which the chute delivered much more than corresponding straight chutes. While this range varies somewhat depending upon the nature of the solid material, in general $\phi$ should be between about 35 to 60°, corresponding to 93 to 29% of half cycloid. Particularly good results are obtained within this range for feeding particulate material of which the bulk thereof is capable of passing through a 4 mesh screen.

When the bulk of the particulate material is capable of passing through a 35 mesh screen, it is preferred that the angle $\phi$ be within the range from about 45 to 59°, corresponding to 63 to 30% of the half cycloid. For intermediate mesh sizes of, say, −4 to +14 mesh, it is preferred to have the angle $\phi$ between about 38 to 43°, corresponding to 82 to 68% of half cycloid.

As indicated above, cycloidal feed chutes constructed in accordance with this invention achieve their greatest value in connection with the feeding of small mesh sized solid material. Preferably the bulk of the solid material is −4 mesh, and optimum results are achieved when the bulk of the solid material is −35 mesh. It will be understood that the usual methods of crushing and grinding, followed by the usual methods of size classification, such as screening, can be employed to grade the particles of solid material. Such procedures are regularly employed in the handling of particulate material in industry, and, therefore, generally it will not be necessary to employ new or special procedures to realize the advantages of the present invention.

This invention is primarily concerned with enclosed chute structures having continuous imperforate walls from their inlet opening to their outlet opening. Probably such chute structures can best be described as "tubular" chutes, and, therefore, this designation will be employed in the present specification and claims. However, it will be understood that "tubular," is used in its broader sense as referring to enclosed chute structures having other than circular cross sections, such as oval, square, rectangular, hexagonal, etc. It has been found that the advantages of this invention are still largely achieved even though the cross-sectional shape of the chute is varied widely. For example, equally good results have been obtained with cycloidal chute structures having a square cross section as with those having a round cross section.

The cycloidal features of this invention have particular value in connection with the feeding of fine mesh size material into rotating cylinders, such as rotary dryers, rotary kilns, etc. Figs. 2 to 4 of the drawing illustrate an application of the cycloidal feed chute in conjunction with this type of apparatus. There is shown at 10 means for feeding into cycloidal feed chute 11, consisting of a storage bin 12 and a screw conveyor 13. The cycloidal feed chute 11 is seen in side elevation, and is constructed in accordance with the present invention. Feed chute 11 is shown discharging into a rotary cylinder 14, which can be, for example, a rotary kiln or rotary dryer. Cylinder 14 is shown mounted for rotation about its longitudinal axis and also being inclined downwardly from its feed and 14a to its discharge end 14b. In the illustration given, rotary cylinder 14 is shown discharging into a receiver means 15, consisting of a floor bin. Such an apparatus might well be employed for the processing of phosphate rock or other mineral rock.

Cycloidal feed chutes possess an additional advantage in connection with the feeding of particulate material into rotating open-ended cylinders such as cylinder 14 shown in Fig. 2. In the feeding of material into rotary kilns or other similar process equipment, there is a tendency for the material being fed to pile up near the feed end of the kiln and spill. To overcome this, it is often necessary to use a retaining ring around the feed end of the kiln; this, however, has the disadvantage of increasing the gas velocity at that point and thereby increasing dust loss from the kiln. Cycloidal-shaped chutes alleviate the problem of spillage and, therefore, possess this additional advantage over straight chutes. The material is conveyed into the feed end of the rotary kiln at a smaller angle with the horizontal than with a straight chute, and the discharge end of the cycloidal chute can be inserted into the rotary kiln or dryer so as to discharge further from its feed end than a straight chute. Both of these factors lessen the tendency of the particulate material to pile up and spill from the kiln.

The theoretical explanation of the results obtained by the present invention is not understood. There is no known theory which would make it predictable that up to twice as much small mesh size material could be passed through a cycloidal feed chute than through a corresponding straight chute.

For the purpose of more fully illustrating the present invention, it is desired to set out the following detailed examples:

*Example I*

Tests were made of feeding finely-pulverized phosphate rock (99% −35 mesh and 83% −100 mesh) through chutes made of smooth-walled pipe of 1⅝ inch inside diameter. A cycloidal chute was made with a generating circle diameter of 40¾ inches. Initially, a half cycloid was tested, and the chute was then systematically shortened by cutting off portions of its lower section. A straight chute made of the same pipe was also tested, and it was correspondingly shortened so as to discharge at the same point as the cycloidal chute. The chutes were discharged into a rotary cylinder revolving at 6 revolutions per minute and having a slope of 1.39 inches per foot.

It was found that for the value of $\phi$ of 32° 29' (corresponding to 100% of a half cycloid), there was no flow through the cycloidal chute, due to frictional resistance. At a $\phi$ value of 45°, flow through the cycloidal chute was appreciable and the maximum rate attainable was 294 pounds per minute, which was 59% greater than that attainable in the corresponding straight chute, namely, 185 pounds per minute. At a $\phi$ value of 47° (58% of a half cycloid), the flow through the cycloidal chute was 371 pounds per minute, which was 98% greater than that attainable in the corresponding straight chute, namely, 187 pounds per minute; this was the optimum fraction of the half cycloid from the standpoint of relative flow compared to a straight chute. At higher values of $\phi$, the flow rate through the cycloidal chute changed very little, and that through the straight chute increased rapidly, so that the relative advantage of the cycloidal chute decreased.

The relative tendency of the phosphate rock to spill out the feed end of the rotary cylinder was observed by comparing the feed rate at which spillage first began to each type of chute. At a $\phi$ value of 45°, spillage began at a rate of 36.5 pounds per minute for the straight chute and at 50 pounds per minute for the cycloidal chute; the cycloidal chute had a relative advantage of 37% greater than the straight chute, since 37% more material could be fed through it to the rotary cylinder without spillage. At a $\phi$ value of 47°, the cycloidal chute had an advantage of 45% over the straight chute, and at 49° its advantage was 101%. At still higher $\phi$ values, the advantage decreased, until at 53°, there was little difference in the two chutes with respect to spillage.

*Example II*

Crushed gravel, screened to four different sizes, and whole soybeans, about ¼" in diameter, were tested as described in Example I. The results of tests to determine the fractional portion of a cycloidal chute giving maximum flow advantage over a corresponding straight chute are as follows:

| Material | Cycloidal chute giving maximum flow advantage | | Percent advantage over straight chute |
|---|---|---|---|
| | $\phi$, degrees | Percent of half cycloid | |
| −0.37″+4 mesh gravel | 37 | 83 | 5 |
| −4+8 mesh gravel | 38 | 82 | 34 |
| −6+14 mesh gravel | 38 | 82 | 33 |
| −35+150 mesh gravel | 47 | 58 | 60 |
| Soybeans | 36 | 90 | 12 |

It is seen that the advantage of the cycloidal chute over the straight chute is greater as the particle size of the gravel decreases, and that the fraction of a half cycloid needed to achieve maximum advantage decreases with decreasing particle size.

The rates at which spillage occurred from the feed end of the chutes were also determined for the various materials. The results are as follows:

| Material | Cycloidal chute giving maximum spillage advantage | | Angle of discharge of cycloidal chute, $\alpha$ | Percent advantage over straight chute |
|---|---|---|---|---|
| | $\phi$, degrees | Percent of half cycloid | | |
| −0.37″+4 mesh gravel | 45 | 63 | 20° 54′ | 69 |
| −4+8 mesh gravel | 49 | 53 | 27° 20′ | 44 |
| −6+14 mesh gravel | 49 | 53 | 27° 20′ | 52 |
| −35+150 mesh gravel | 55 | 39 | 36° 48′ | 47 |
| Soybeans | 51 | 48 | 30° 30′ | 54 |

It is seen that from 44% to 69% more material can be fed through the cycloidal chute without spillage from the rotary cylinder than through the corresponding straight chute.

In the foregoing specification, specific embodiments of the present invention have been set out in considerable detail for the purpose of illustration, but it will be apparent to those skilled in the art that many of the specific details set forth can be varied widely without departing from the spirit of the invention.

We claim:
1. A structure for use in feeding particulate material comprising a tubular feed chute having a downward curvature approximating the curvature of a segment of a cycloid originating at the top of said chute, said segment extending for about 29 to 93% of half cycloid, and said feed chute terminating adjacent the end of said segment.

2. A structure for use in feeding particulate material comprising a tubular feed chute having a downward curvature approximating the curvature of a segment of a cycloid originating at the top of said chute, said segment extending for about 30 to 63% of half cycloid, and said feed chute terminating adjacent the end of said segment.

3. In a method of feeding solid particulate material from a higher to a lower point, in which the bulk of said particulate material is capable of passing through a 4 mesh screen, the steps of passing said material downwardly along a path having the curvature of a segment of a cycloid with said higher point as the point of origin of said cycloid, and the angle between a straight line connecting said higher and lower points and a horizontal line originating at said lower point being between about 35 to 60°, and discharging said particulate material from said lower point.

4. In a method of feeding solid particulate material from a higher to a lower point, in which the bulk of said particulate material is capable of passing through a 35 mesh screen, the steps of passing said material downwardly along a path having the curvature of a segment of a cycloid with said higher point as the point of origin of said cycloid and the angle between a straight line connecting said higher and lower points and a horizontal line originating at said lower point being between about 45 to 59°, and discharging said particulate material from said lower point.

References Cited in the file of this patent

UNITED STATES PATENTS

| 325,259 | Mathey | Sept. 1, 1885 |
| 488,846 | Snell et al. | Dec. 27, 1892 |
| 674,353 | Durant | May 14, 1901 |
| 705,365 | Law | July 22, 1912 |
| 1,138,431 | West | May 4, 1915 |
| 2,251,079 | Strom et al. | July 29, 1941 |